United States Patent [19]
Klein

[11] 3,961,741
[45] June 8, 1976

[54] HEAT TRANSFER TUBES WITH INTERNAL EXTENDED SURFACE

[75] Inventor: Eric Klein, Verona, N.J.

[73] Assignee: Foster Wheeler Energy Corporation, Livingston, N.J.

[22] Filed: Mar. 15, 1974

[21] Appl. No.: 451,721

Related U.S. Application Data

[63] Continuation of Ser. No. 288,606, Sept. 13, 1972, abandoned.

[52] U.S. Cl................................. 228/144; 228/145
[51] Int. Cl.² ........................................ B23K 31/02
[58] Field of Search............ 29/477.3, 477.7, 471.3, 29/477, 157.3 A, 157.3 AH, 157.3 B; 228/144, 145, 146, 185

[56] References Cited
UNITED STATES PATENTS

| | | | |
|---|---|---|---|
| 1,324,714 | 12/1919 | Allen | 29/477.3 |
| 2,160,586 | 9/1937 | Gettig | 29/477 |
| 2,584,189 | 3/1949 | Dalin | 29/157.3 B |
| 2,961,749 | 11/1960 | Brown | 228/6 X |

FOREIGN PATENTS OR APPLICATIONS

| | | | |
|---|---|---|---|
| 1,127,478 | 9/1968 | United Kingdom | 29/157.3 A |

*Primary Examiner*—Al Lawrence Smith
*Assistant Examiner*—Margaret M. Joyce
*Attorney, Agent, or Firm*—John E. Wilson; Marvin A. Naigur

[57] ABSTRACT

Heat transfer tubes are provided internally with extended surfaces to improve heat transfer between a fluid within the tube and a fluid outside of and in contact with the tube. A flat sheet of metal is provided with extended surfaces which are welded to one side of the sheet, so that a tube with internal extended surfaces can be formed by bending the sheet so that it envelopes the surfaces and welding sides of the sheets together.

5 Claims, 11 Drawing Figures

U.S. Patent   June 8, 1976   3,961,741
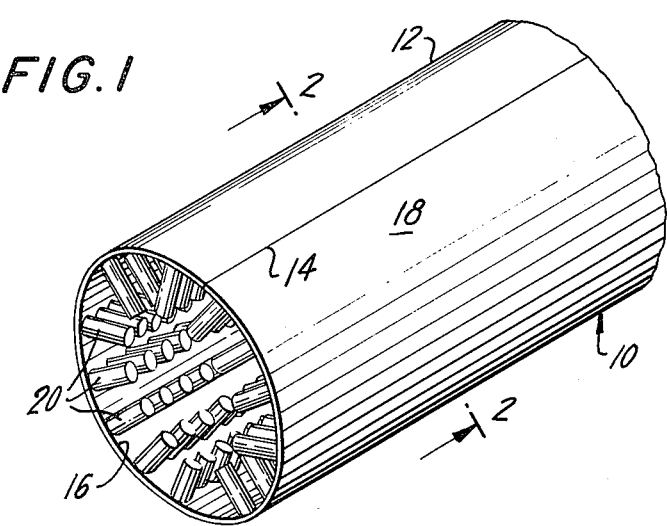
FIG.1
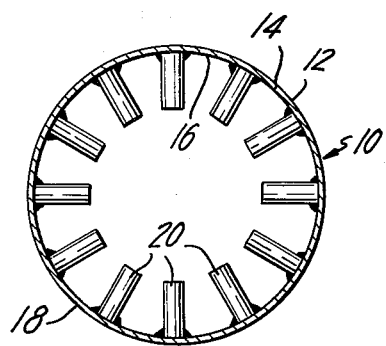
FIG.2
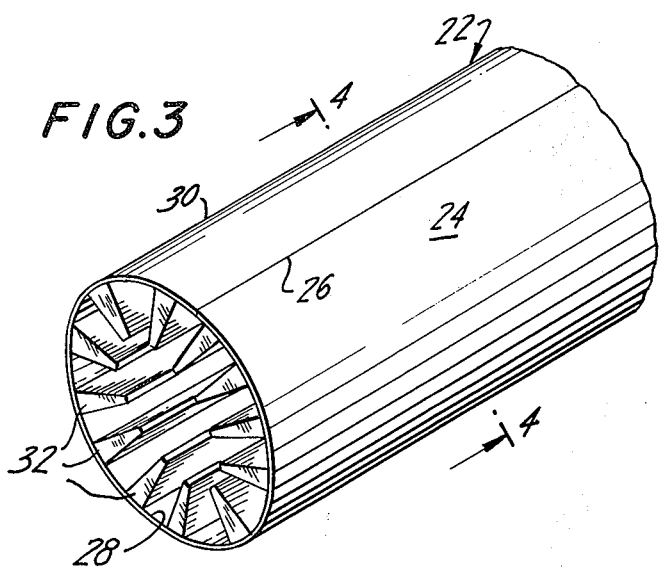
FIG.3
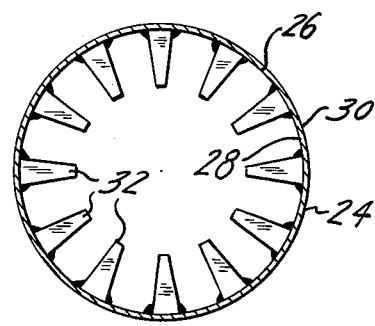
FIG.4
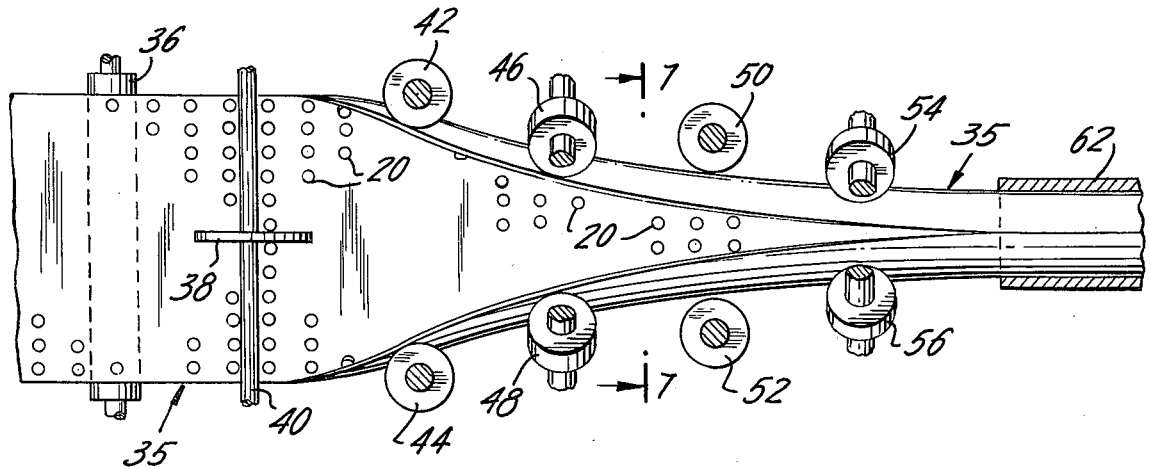
FIG.5
FIG.6

HEAT TRANSFER TUBES WITH INTERNAL EXTENDED SURFACE

CROSS-REFERENCE TO RELATED APPLICATION

The present application is a continuation of application Ser. No. 288,606, filed Sept. 13, 1972, now abandoned.

BACKGROUND OF THE INVENTION

In the equipment used to indirectly transfer heat between one fluid and another, one of the most common ways to increase the amount of heat which can be transferred is to provide for an increased surface of the material which separates the two fluids and through which the heat is conducted. This is no problem if the heat transfer surface is more or less flat because it is a simple matter to weld fins on either or both sides of the flat surface to increase the amount of heat which can be transferred between fluids on either side of it.

In a situation where a tube is used to transfer heat between a fluid inside of it and a fluid in contact with the outer surface of the tube, it is relatively simple to provide an extended heat transfer surface on the exterior of the tubes. All that is necessary is to weld elements such as fins, channels, strips, studs, spines or other elements to the outside of the tubes.

Providing an extended heat transfer surface in the interior of the tube is not such a simple matter. If the tube is of any appreciable length, it is not possible to position welding equipment inside of the tube to secure the heat transfer elements to the tube unless the tube is of extremely large diameter. As a result, the heat transfer capability of any tube is limited and in many applications the only way to increase the heat transfer capacity of a heat exchanger using tubes is to increase the number of tubes which are used to transfer heat. The result is an increase in cost and size of the heat exchanger.

SUMMARY OF THE INVENTION

It is an object of the present invention to overcome drawbacks found in the prior art such as those discussed above. Accordingly, a tube with interior extended heat exchange surface is provided by welding the extended surface elements to one side of a sheet which is then formed into a tube so that the elements are in the interior of the tube.

BRIEF DESCRIPTION OF THE DRAWINGS

FIG. 1 is a view in perspective of a portion of a tube made in accordance with the present invention;

FIG. 2 is a view, partly in section, taken substantially along the line 2—2 of FIG. 1;

FIG. 3 is a perspective view of a portion of another tube made in accordance with the present invention;

FIG. 4 is a view, partly in section, taken substantially along the line 4—4 of FIG. 3;

FIG. 5 is an end view of a web made from a sheet with extended heat transfer surface welded to one side thereof and which is used to form heat transfer tubes in accordance with the present invention;

FIG. 6 is a schematic view showing the web of FIG. 5 being formed into heat transfer tubes;

DETAILED DESCRIPTION OF THE PREFERRED EMBODIMENT

Figure 7:
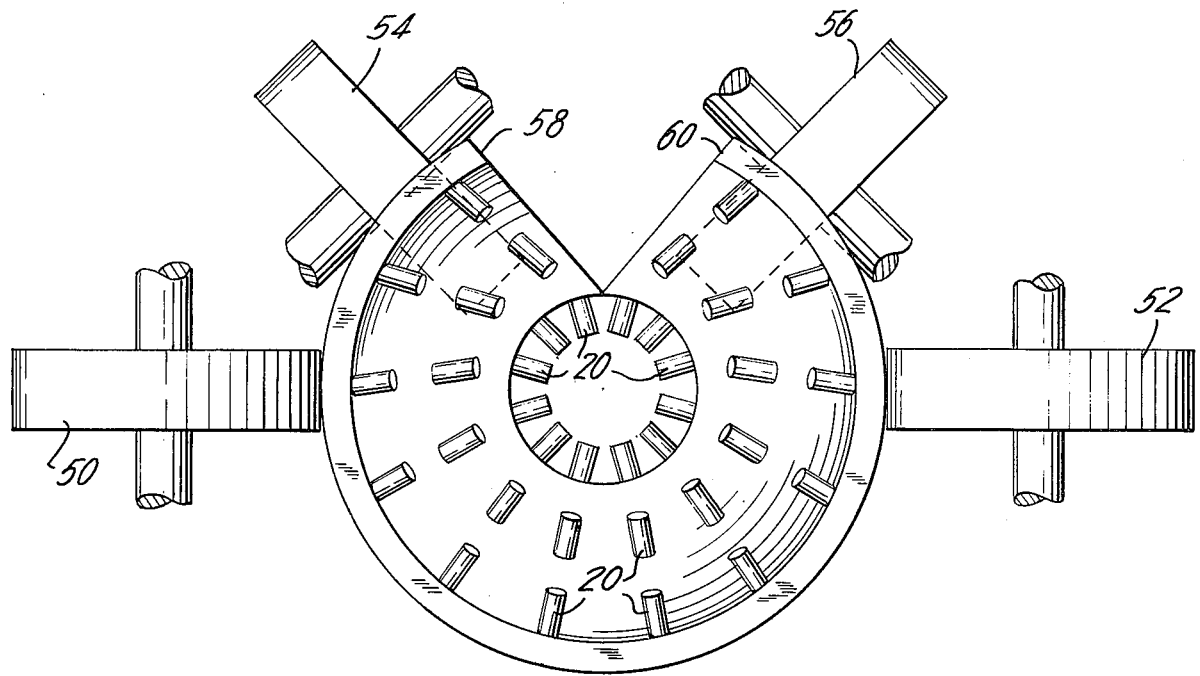
FIG. 7 is a view taken substantially along the line 7—7 of FIG. 6.
Figure 8:
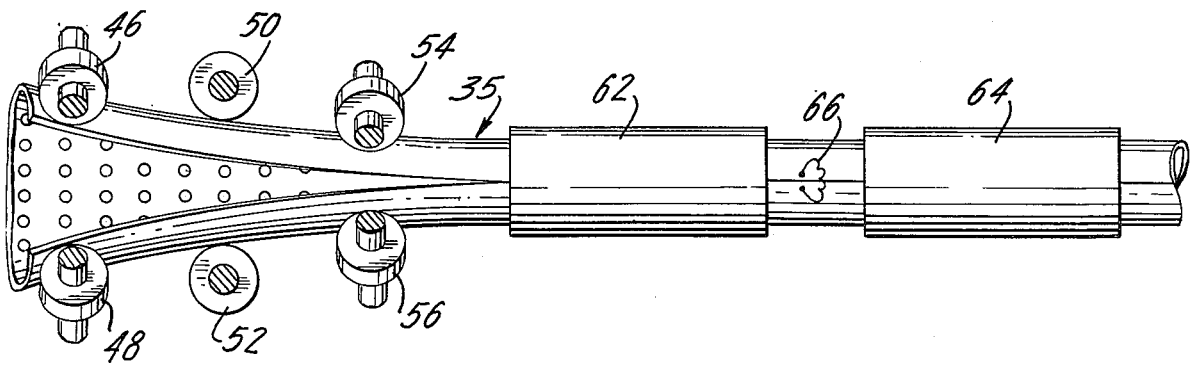
FIG. 8 is a view showing the tube formed in FIG. 6 being welded.

FIGS. 1 through 4 all show tubes which are made in accordance with the present invention. The tube 10 of FIGS. 1 and 2 has a cylindrical sidewall 12 with a longitudinally extending straight seam 14 which, as shown best in FIG. 2, is a butt weld extending the length of the tube 10. The sidewall 12 has an interior surface 16 and an exterior surface 18. A plurality of studs 20 are welded to the interior surface 16 to increase the transfer of the heat of any fluid within the tube to the tube itself. The heat is then transferred to an ambient fluid; that is, the fluid in contact with the exterior surface 18 of the heat transfer tube 10.

FIGS. 3 and 4 show another type of interior extended heat exchange surface tube made in accordance with the present invention. The heat exchange tube indicated generally as 22 has a sidewall 24 which is generally cylindrical in configuration and a seam 26 which extends longitudinally along the tube 22 and, as seen best in FIG. 4, is a butt seam. The sidewall 24 has an interior surface 28 and an exterior surface 30. Spines 32 are welded to the interior surface 28 to provide extended heat exchange surfaces running parallel to the tube.

For purposes of easy explanation, the manufacturer of heat transfer tubes of the type illustrated in FIGS. 1 and 2 only will be explained in detail. It is understood that the present invention contemplates the manufacture of tubes having internal extended heat exchange surfaces of many shapes and sizes. As already noted, the internal extended heat exchange surfaces could be fins, channels, strips, studs, spines, or any other kind of extended surface which can be used on heat exchange tubes externally to include the exchange of heat from the tube to the ambient fluid.

The manufacture of the present heat exchange tube begins with a flat sheet of material 34 to which is welded a plurality of heat exchange elements, such as the studs 20. This results in a web 35, such as is shown clearly in FIG. 5.

The next step is to form the web 35 into a cylinder heat exchange tube. This can be done in the manner shown in FIG. 6 where the web 35 is fed over a roller 36 and under a wheel 38 which is affixed on a shaft 40 so that the wheel 38 will ride between two rows of studs 20 without interfering with the forward motion of the web 35 and without breaking or bending any of the studs 20. The web is thereafter progressively formed into a cylinder by being passed through pairs of roller wheels. Thus, the side portions of the web 35 are contoured upwardly as they pass over the roller wheels 42 and 44. Thereafter, marginal end portions of the web 35 are contoured downwardly by roller wheels 46 and 48. As the web moves at the right, as shown in FIG. 6, it is progressively formed into a cylinder. Roller wheels 50 and 52 engage against the sides of the web 35 to bring the edges 58 and 60 closer together. The edges 50 and 60 are brought still closer together by roller wheels 54 and 56, each of which engage against the upper portion of the web 35 which is now starting to resemble a cylinder. The reaction of rollers 54 and 56 is down and inward. FIG. 7 shows the engagement of the rollers 50, 52, 54 and 56 and the web 35 being brought into a shape which resembles a cylinder more and more as it moves to the right, as viewed in FIG. 6. After passing through the last pair of roller wheels 54 and 56, the web 35 passes through a cylindrical die 62 which brings the edges 58 and 60 together so that they abut. After passing through the die 62, the web 35 passes through a second die 64 which is axially spaced from the die 62. Placed between the dies 62 and 64 is a fusion welder 66 which welds the abutted edges 58 and 60 together into the butt weld seam 14. After leaving the die 64, the web 34 has been shaped into the heat transfer tube 10 which is shown in FIGS. 1 and 2. The tube can be cut into convenient lengths or the length of the web 35 used to make the tubes can be selected so that no cutting operation is necessary.

Figure 9:
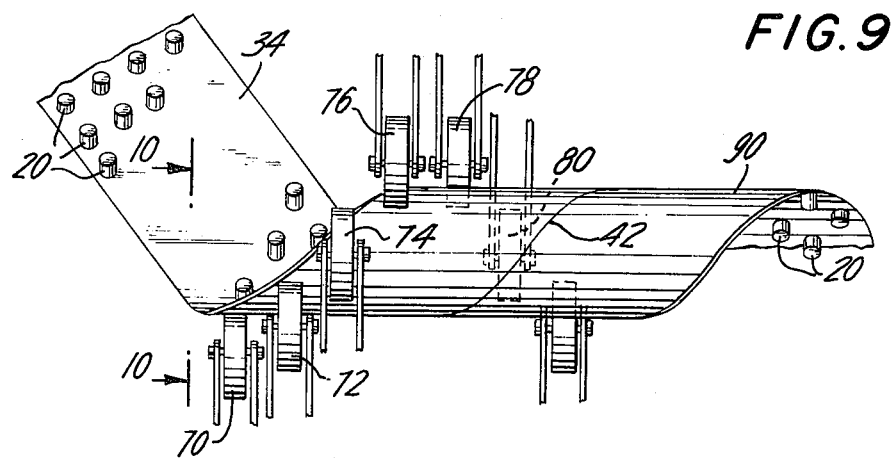
FIG. 9 is a schematic view showing another way of making a tube of the present invention.
Figure 10:
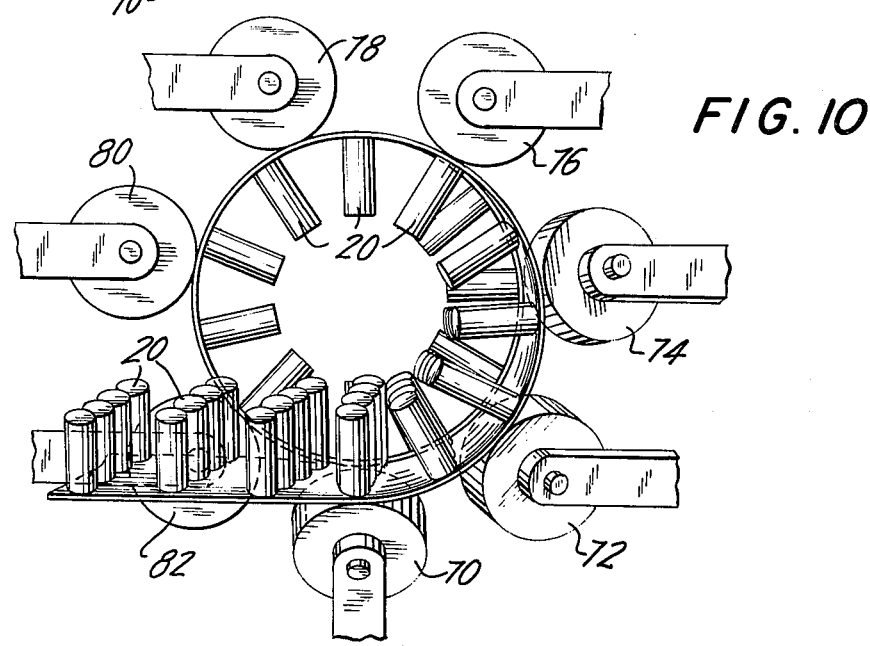
FIG. 10 is a view taken substantially along the line 10—10 of FIG. 9.
Figure 11:
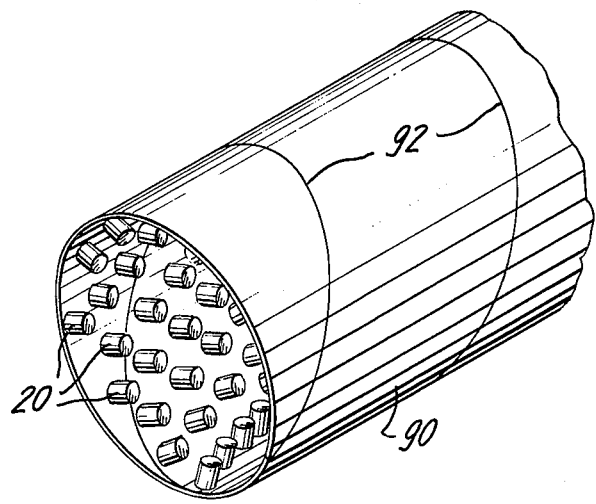
FIG. 11 is a view in perspective of a tube made by the method of FIG. 9.

It is also possible to make heat transfer tubes with internal extended heat transfer surfaces by spirally winding the web 35. Such a method is illustrated in FIGS. 9 and 10. As shown in FIG. 9, the web 35 is fed at an angle into a plurality of spirally arranged rollers 70, 72, 74, 76, 78, 80 and 82, which engage against the outside of the spirally wound cylinder being formed within them. The edges 58 and 60 are abutting when they pass close to a welder 84 which welds them into a seam 86. A tube 90 with a spiral seam 86 thus moves off axially to the right of the rollers 70 to 82, as shown in FIG. 9. The finished product is shown in FIG. 11.. A cutter may be provided to cut the tube 90 into the desired lengths. Alternately, the web 35 may be of a length pre-selected to result in a tube 90 of the desired length.

The foregoing describes but one preferred embodiment of the present invention, other embodiments being possible without exceeding the scope of the present invention as designed in the following claims.

What is claimed is:

1. The method of manufacturing a heat exchange tube with internal heat exchange surfaces comprising the steps of:
   providing an elongated flat sheet of heat exchange material having two parallel edges;
   providing a plurality of individual heat exchange elements solid through their entire cross sections, each having a width which is a small portion of the width of said elongated flat sheet;
   placing on one face of said sheet a plurality of said heat exchange elements so that said heat exchange elements are free of contact with each other and free of contact with any element other than said sheet so that the width of each of said heat exchange elements covers only a small portion of the width of said heat exchange material;
   welding said plurality of heat exchange elements to said face of said sheet to form a web;
   moving said two edges of said web together to envelop said elements, form a tube with said face forming the inside surface of said tube with said elements inside of said tube and bring said edges into proximity; and
   welding said edges together to form a seam.

2. The method defined in claim 1 wherein said edges are moved together so that they do not move longitudinally of said sheet, so that a cylinder is formed with said edges abutting along a line parallel to the longitudinal axis of said cylinder.

3. The method defined in claim 1 wherein said sheet is spirally wound into a cylinder so that the edges meet on a helix which is coaxial with the longitudinal axis of said cylinder.

4. The method defined in claim 2 wherein said heat exchange elements are elongated and are arranged so that they extend parallel to said two parallel edges of said sheet before being welded to said face to form said web.

5. The method defined in claim 2 wherein said heat exchange elements are studs and wherein said web is formed by welding said studs to said face in rows parallel to said two edges of said sheet to form said web.

* * * * *